United States Patent [19]

Suzuki et al.

[11] Patent Number: 4,865,407
[45] Date of Patent: Sep. 12, 1989

[54] OPTICAL WAVEGUIDE ELEMENT, METHOD OF MAKING THE SAME AND OPTICAL COUPLER EMPLOYING OPTICAL WAVEGUIDE ELEMENT

[75] Inventors: Akihiro Suzuki, Nishio; Makoto Suzuki, Nagoya; Yutaka Hattori, Aichi; Kazuyuki Miyaki, Ichinomiya; Masayuki Yoshida; Kazunari Taki, both of Nagoya; Yoshinori Bessho, Mie, all of Japan

[73] Assignee: Brother Kogyo Kabushiki Kaisha, Aichi, Japan

[21] Appl. No.: 262,693

[22] Filed: Oct. 26, 1988

[30] Foreign Application Priority Data

Oct. 22, 1987 [JP] Japan .................................. 62-274100
Apr. 22, 1988 [JP] Japan .................................. 63-100914
May 9, 1988 [JP] Japan .................................. 63-112236
May 9, 1988 [JP] Japan .................................. 63-112237
Jun. 6, 1988 [JP] Japan .................................. 63-138700
Jun. 10, 1988 [JP] Japan .................................. 63-144534
Jul. 5, 1988 [JP] Japan .................................. 63-168508

[51] Int. Cl.$^4$ .............................................. G02B 6/12
[52] U.S. Cl. ................................ 350/96.12; 350/96.13
[58] Field of Search ............... 350/96.11, 96.12, 96.13, 350/96.14, 96.15

[56] References Cited

U.S. PATENT DOCUMENTS 4,691,982  9/1987  Nishimura et al. ............. 350/96.12
4,693,544  9/1987  Yamasaki et al. ............... 350/96.12
4,705,346  11/1987 Miyawaki ..................... 350/96.12 X
4,737,015  4/1988  Ishida et al. .................. 350/96.12 X
4,776,655  10/1988 Robertson et al. .............. 350/96.12
4,778,236  10/1988 Miyawaki ..................... 350/96.12 X
4,792,200  12/1988 Amann et al. .................. 350/96.12

Primary Examiner—William L. Sikes
Assistant Examiner—Akm E. Ullah
Attorney, Agent, or Firm—Oliff & Berridge

[57] ABSTRACT

An optical waveguide element includes an optical waveguide formed on a light-transmissive dielectric substrate and having a higher refractive index than the refraction index of the substrate, the optical waveguide including a region having an effective refractive index which varies nonlinearly in a direction in which a light wave is propagated through the optical waveguide. The light wave guided through the optical waveguide enters the region, in which the angles of incidence and reflection of the guided wave at the boundary between the region and the substrate is gradually reduced due to the variation in the effective refractive index. When the angles of incidence and reflection of the guided wave becomes smaller than a critical angle, the guided wave is emitted out of the waveguide. Since the effective refractive index changes nonlinearly with respect to the distance the guided wave is propagated, the light emitted into the substrate tends to converge at a point, and the beam pattern of the emitted light is spread less.

9 Claims, 19 Drawing Sheets

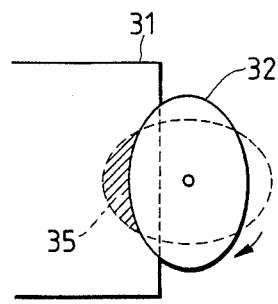
FIG. 10
FIG. 11(a)
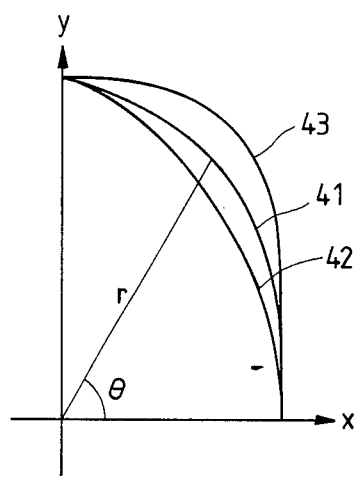
FIG. 11(b)
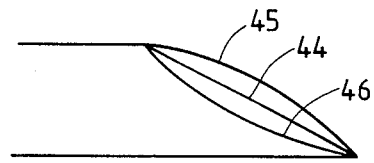
FIG. 12(a)
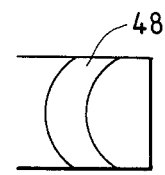
FIG. 12(b)
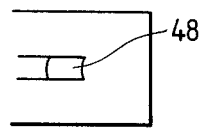
FIG. 12(c)
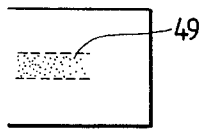

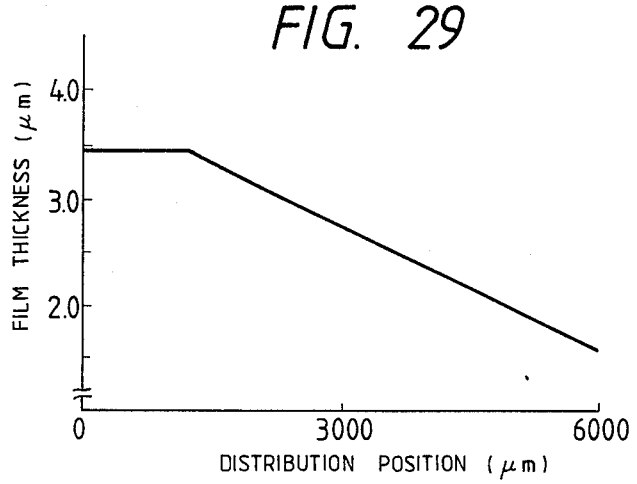
FIG. 29
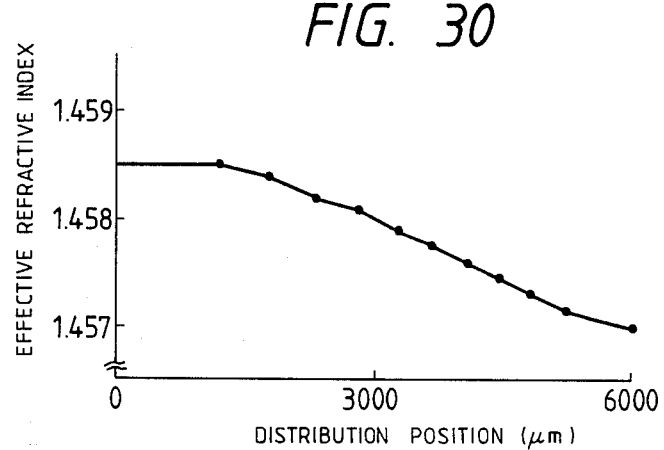
FIG. 30
FIG. 31
FIG. 32
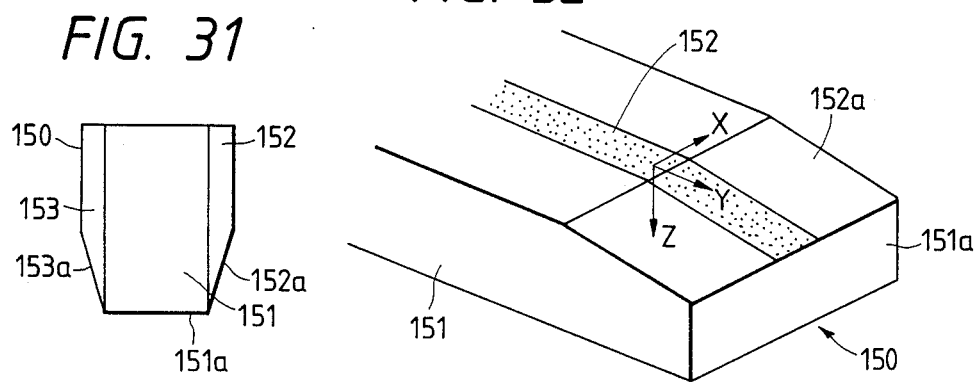

OPTICAL WAVEGUIDE ELEMENT, METHOD OF MAKING THE SAME AND OPTICAL COUPLER EMPLOYING OPTICAL WAVEGUIDE ELEMENT

BACKGROUND OF THE INVENTION

The present invention relates to an optical waveguide element for use in an optical integrated circuit, a method of manufacturing such an optical waveguide element, and an optical coupler which employs such an optical waveguide element for coupling optical power.

Optical integrated circuits include an optical waveguide element comprising an optical waveguide formed by a portion with a slightly higher refractive index on the surface of a single substrate. An optical integrated circuit also contains various other optical components such as a laser diode as a light source, a switch, a modulator, a photodiode as a photodetector, and others. The integration of such an optical circuit makes an optical system incorporating the same, small in size, lightweight, stable in operation, and high in performance.

An optical waveguide element comprises a dielectric substrate capable of transmitting light therethrough, typically made of glass, and a waveguide portion in the form of film formed by deposition or diffusion on the surface of the substrate, the waveguide portion having a slightly high refractive index and a thickness as small as the wavelength of light to be passed through the waveguide portion. Light applied to the optical waveguide element is confined in and guided through the high-refractive-index waveguide portion.

One known optical waveguide element includes, as shown in FIG. 45 of the accompanying drawings, an optical waveguide 410 formed by an ion exchange process (proton exchange process) replacing Li+ with H+ in the crystal of an optical material 400 such as lithium niobate ($LiNbO_3$). Another optical waveguide element has an optical waveguide 410 formed in the optical material 400 by diffusing titanium oxide ($TiO_2$) which serves to increase the refractive index of the optical material 400. A method of fabricating an optical waveguide element based on the proton exchange process and such an optical waveguide element are disclosed in NIKKEI ELECTRONICS, page 90, line 3 to 10, published July 14, 1986.

According to another known fabrication method, an optical material as shown in FIG. 46 is produced, thereafter magnesium oxide (MgO) which reduces the refractive index of an optical material 420 is diffused into the optical material 420 to produce therein an optical waveguide 430 having a higher refractive index than that of the surrounding optical material 420.

FIG. 47 shows an end coupling method for applying a light wave to or emitting a light wave from an optical waveguide element. An end face of a substrate 510 having an optical waveguide 500 is ground, and a light wave is converged by a light converging means 520 such as a condenser lens and applied directly to the optical waveguide 500 through the ground end face.

FIG. 48 illustrates a prism coupling method which couples optical power through the use of a prism 530 such as a rutile prism having a higher refractive index than that of an optical waveguide 500 formed in a substrate 510. The excitation of a guided wave is effected by distribution matching between the applied or emitted wave and a guided mode.

Another known method is a tapered coupling method as shown in FIG. 49 which employs an optical waveguide 500 including a tapered end portion 540 progressively varying in thickness. A light wave guided by the waveguide 500 partly passes through the boundary between the waveguide 500 and a substrate 510 and radiates into the substrate 500. The amount of a light wave entering the substrate 500 progressively increases toward the tip end of the tapered portion 540. The guided wave which has traveled through the waveguide 500 is cut off and caused to radiate into the substrate 510 at a position where the thickness of the waveguide 500 is of a certain reduced value. It is possible to couple an output light beam with an optical fiber 550, as indicated by the broken lines, by utilizing the waist of the light beam.

FIGS. 50 and 51 illustrate a grating coupling method in which a grating coupler 570a comprising diffraction grating slits on the surface of a substrate 560 is employed to effect conversion between a guided mode in which a light wave is guided through a waveguide layer 570 and a radiation mode in which the guided wave is emitted out of the waveguide layer 570, for coupling optical power.

A tapered waveguide may be fabricated by a method as shown in FIG. 52. A mask 580 is positioned parallel to and spaced a small distance from a substrate 510 in partly over-lapping relation thereto. Particles 600 of the material forming an optical waveguide film are then applied perpendicularly to the substrate 510 by sputtering or evaporation. A tapered end portion 540 of the waveguide is formed by material particles 600 which enters for step converge into a masked area 590 below the mask 580.

The end coupling method as shown in FIG. 47 is disadvantageous in that a light beam to be applied to the waveguide has to be positionally adjusted in the order of several microns outside of the waveguide into alignment with the waveguide which is 2 to 5 $\mu$m thick, and the end face of the waveguide has to be ground for required flatness.

The prism coupling method as shown in FIG. 48 allows relatively easy coupling of optical power, but has problems in that it requires fine adjustment of the gap and the beam applying position, is poor in stability, and needs an expensive prism of high refractive index and high precision and adjustment mechanism of prism.

According to the tapered coupling method as shown in FIG. 49, since the waveguide has a flat tapered shape with the thickness linearly varying in the direction in which the wave is transmitted, the output beam from the waveguide is large in diameter, and also since the beam diameter progressively increases as it goes away from the waveguide, the coupling efficiency between the optical waveguide and another optical element such as an optical fiber is low.

According to the grating coupling method as shown in FIG. 50, if the grating coupler 570a (FIG. 49) has to have a light converging ability, the grating coupler has to be a chirped grating in which the distance between adjacent grating slits is progressively smaller. FIG. 51 shows such a chirped grating coupler. The grating coupler comprises a substrate 560 of silicon (Si), a buffer layer 610 of silicon oxide ($SiO_2$) deposited on the substrate 560 up to a thickness of 1.86 $\mu$m, a waveguide 570 of glass #7059 manufactured by Corning, U.S.A., which is deposited on the buffer layer 610 up to a thickness of 0.95 $\mu$m, and a cladding layer 620 of silicon nitride (SiN) deposited on the waveguide 570 up to a thickness of 0.035 μm. With the distance between adjacent grating slits being progressively vaired from 0.75 μm to 0.52 μm for a length of 1.0 mm, a light beam having a wavelength of 590 nm is converged at a point in space which is 2.0 mm away from the grating coupler. The grating coupler has to be manufactured using an electron beam printing process which produces such closely spaced grating slits. The efficiency of light utilization of the grating coupler is low, about 50%.

A laser beam, for example, is applied to an optical waveguide element through either a glass fiber bonded to the end face of the optical waveguide element or an optical lens located near the end face of the optical element.

Accordingly, the end face of the optical waveguide element must be of a mirror finish. If an edge of the end face of the optical waveguide element were broken away or round, it would cause dispersion or refraction of light, resulting in a loss of light between the glass fiber and the optical waveguide element. It would highly be difficult to fabricate an optical waveguide element without breaking away or rounding an edge of the end face thereof.

SUMMARY OF THE INVENTION

In view of the aforesaid drawbacks of the conventional optical waveguide elements and methods of making the same, it is an object of the present invention to provide an optical waveguide element capable of well converging light and being efficiently coupled with another optical element, and a method of manufacturing such an optical waveguide element simply with good reproducibility.

Another object of the present invention is to provide an optical coupler capable of well converging light and being efficiently coupled with another optical element.

Still another object of the present invention is to provide an optical head which is capable of high-speed access, requires fewer optical axis adjustment, is highly reliable, small in size, and lightweight.

According to one aspect of the present invention, there is provided an optical waveguide element including an optical waveguide formed on a light-transmissive dielectric substrate and having a higher refractive index than the refractive index of the substrate, the optical waveguide including a region having an effective refractive index which varies nonlinearly in a direction in which a light wave is propagated through the optical waveguide. The light wave guided through the optical waveguide enters the region, in which the angles of incidence and reflection of the guided wave at the boundary between the region and the substrate is gradually reduced due to the variation in the effective refractive index. When the angles of incidence and reflection of the guided wave becomes smaller than a critical angle, the guided wave is emitted out of the waveguide. Since the effective refractive index changes nonlinearly with respect to the distance the guided wave is propagated, the light radiated into the substrate tends to converge at a point, and the beam pattern of the emitted light is spread less.

According to another aspect of the present invention, there is also provided a method of manufacturing an optical waveguide element having a light-transmissive dielectric substrate and an optical waveguide formed on the substrate and having a higher refractive index than the refractive index of the substrate, the method comprising the steps of: preparing a light-transmissive dielectric substrate, and depositing on the substrate a light-transmissive thin film having a higher refractive index than the refractive index of the substrate, the thin film having a thickness which varies nonlinearly in a direction in which a light wave is propagated to vary an effective refractive index of the thin film.

According to still another aspect of the present invention, there is also provided a method of manufacturing an optical waveguide element having a light-transmissive dielectric substrate and an optical waveguide formed on the substrate and having a higher refractive index than the refractive index of the substrate, the method comprising the steps of: preparing a light-transmissive dielectric substrate, depositing on the substrate a diffusing material in the form of a film which will vary the refractive index of the substrate dependent on the amount by which the diffusing material is diffused into the substrate, the film having a thickness which varies nonlinearly in a direction in which a light wave is propagated, and thermally diffusing the diffusing material into the substrate.

With the above manufacturing methods of the present invention, an optical waveguide element can easily be manufactured with good reproducibility.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a plan view of a mask of the film thickness distribution producing device and a substrate;

FIG. 11(a) is a view showing the shapes of masks;

FIG. 11(b) is a view showing film thickness distributions;

FIGS. 12(a), 12(b), and 12(c) are views showing a process of producing a refractive index distribution;

FIG. 29 is a graph showing a thickness distribution;

FIG. 30 is a graph showing an effective refractive index distribution corresponding to the thickness distribution shown in FIG. 29;

FIG. 31 is a side elevational view of a double-face optical coupler according to a sixth embodiment of the present invention;

FIG. 32 is a fragmentary perspective view of a tapered coupler of the double-face optical coupler;

FIG. 34 is a view showing the coupled-face optical coupler incorporated in a device for reading an optical disc or the like;

DETAILED DESCRIPTION OF THE PREFERRED EMBODIMENTS

An optical waveguide element according to a first embodiment of the present invention is illustrated in FIGS. 1 through 5.

Figure 1:
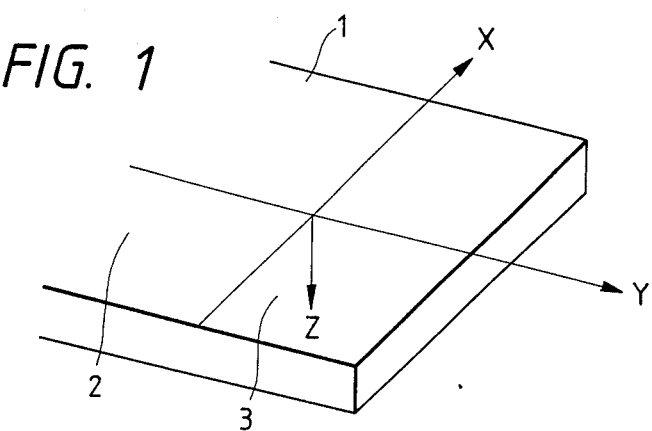
FIG. 1 is a fragmentary perspective view of an optical waveguide element according to a first embodiment of the present invention.
Figure 2:
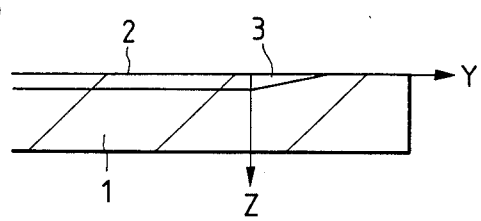
FIG. 2 is a fragmentary cross-sectional view of the optical waveguide element of the first embodiment.

FIGS. 1 and 2 show the optical waveguide element, FIG. 1 being a perspective view of the optical waveguide element and FIG. 2 being a cross-sectional view taken along a Y-axis. The optical waveguide element comprises a substrate 1 made of an optical crystal of Z-cut lithium niobate ($LiNbO_3$), for example, and a two-dimensional waveguide 2 and a distributed-refractive-index region 3 which are formed on the substrate 1. The substrate 1 has a refractive index of 2.2 with respect to extraordinary light, and the two-dimensional waveguide 2 has a surface refractive index of 2.22 with respect to the substrate 1 with the refractive index distribution being a Gaussian distribution in the direction of depth (Z-axis). The distributed-refractive-index region 3 has a length of 6000 $\mu m$ in the direction of a Y-axis. If the boundary between the two-dimensional waveguide 2 and the distributed-refractive-index region 3 is indicated by Y=0, then the surface refractive index at Y ($\mu m$) is $2.2+0.02\times[-(Y/6000)^{0.5}+1]$.

Figure 3:
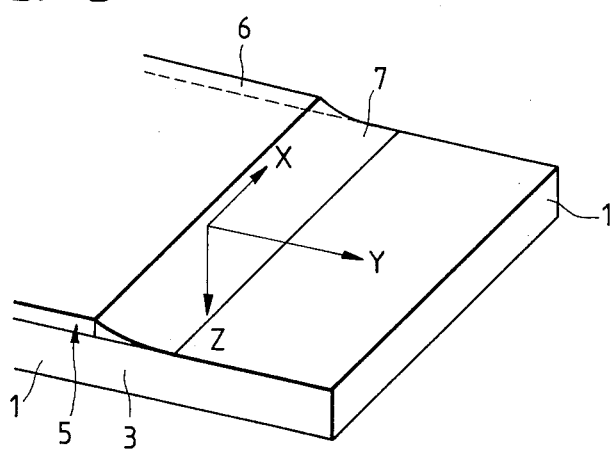
FIG. 3 is a fragmentary perspective view showing a method of manufacturing the optical waveguide element of the first embodiment.

The process of fabricating the optical waveguide element is illustrated in FIG. 3. Titanium (Ti) 5 is patterned on the substrate 1 made of a crystal of Z-cut $LiNbO_3$ while moving a mask to leave a film thickness of 400 Å in an area 6 where the two-dimensional waveguide 2 will be formed and a film thickness of $[400\times(-(Y/6000)^{0.5}+1]$Å in the same coordinate system as that shown in FIG. 1, thus obtaining a film thickness distribution. Then, the titanium film 5 is then diffused into the substrate 1 for 6 hours at 1000° C. to produce the optical waveguide element having an effective refractive index which varies nonlinearly in a direction in which a light wave is propagated shown in FIGS. 1 and 2.

Figure 4:
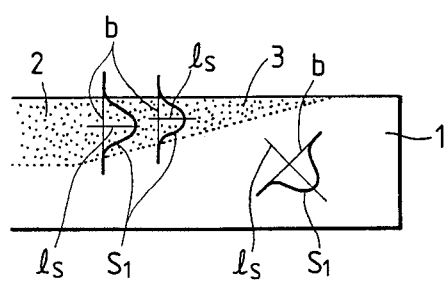
FIG. 4 is a fragmentary view showing the manner in which a guided wave is emitted from the optical waveguide element of the first embodiment.

FIG. 4 shows the manner in which a guided wave is emitted from the optical waveguide element. Curves $S_1$ in FIG. 4 show beam intensity patterns of a light wave which is propagated through the optical waveguide 2, the beam intensity being indicated by height from bottom line b. And straight lines $l_s$ in FIG. 4 show propagating direction of a light beam wave. Since the effective refractive index gradually varies in the distributed-refractive-index region 3, the beam intensity pattern of the propagated light beam wave varies as shown. The energy of a portion of the guided wave corresponding to the variation in the intensity pattern radiates into the substrate 1 of a close refractive index. The waveguide region 3 contacting mediums of different refractive indexes, i.e., air having a refractive index of 1 and the substrate having a refractive index of 2.2, on opposite surfaces thereof in the Z-axis direction has a cutoff point where the guided wave can no longer be confined in the waveguide. The energy of the guided wave is caused to radiate in its entirety into the substrate 1.

Figure 5:
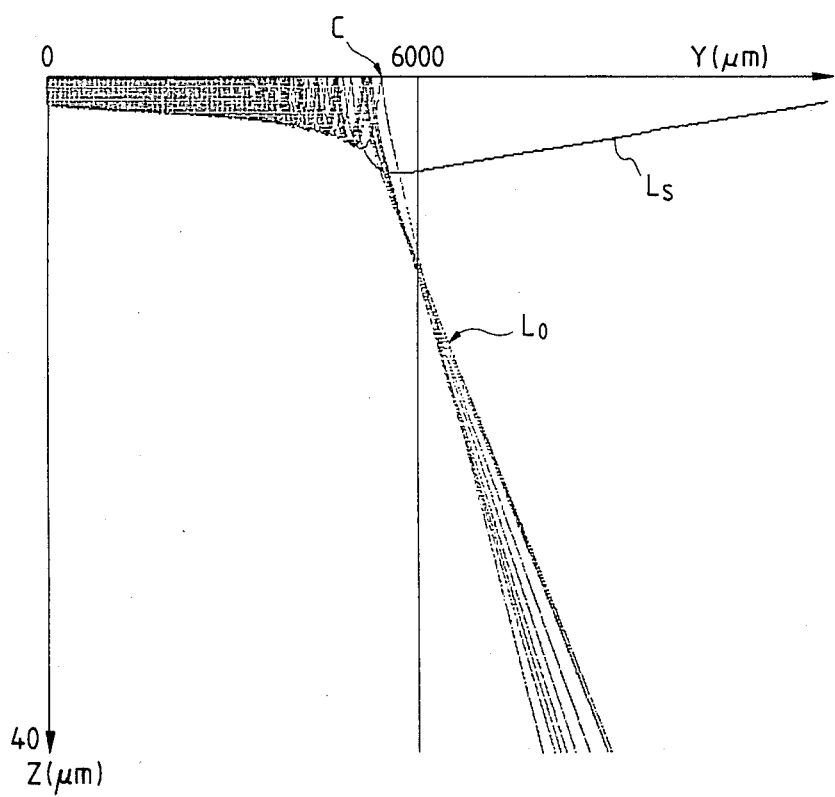
FIG. 5 is a view illustrating the emitted light which is plotted by a ray tracing process.

FIG. 5 shows the manner in which the guided wave is emitted into the substrate 1, as plotted by a ray tracing process. The guided wave is emitted as an emitted light Lo into the substrate 1 at a cutoff point C which is slightly in front of the distance of 6000 μm. A light ray Ls is scattered light.

While the emission of light has been described above, light wave can enter and travel through the optical waveguide element 1 in the same way as described above. The optical material of the optical waveguide element is not limited to a dielectric. It is possible to change the pattern of the emitted light by varying the refractive index distribution.

With the optical waveguide element of the above construction, a light wave guided through the optical waveguide enters the distributed-refractive-index region, in which the angles of incidence and reflection of the guided light wave at the boundary between the region and the substrate is gradually reduced due to a change in the effective refractive index. When the angles of incidence and reflection of the guided light wave becomes smaller than a critical angle, the guided light wave is emitted out of the waveguide. Since the effective refractive index changes nonlinearly with respect to the distance the guided wave is propagated, the light wave emitted into the substrate tends to converge at a certain point, and the beam pattern of the emitted light is spread less. The optical waveguide element of the foregoing embodiment is excellent in converging light, providing a high coupling efficiency with respect to another optical element such as an optical fiber. Where the optical waveguide element of the invention is employed as an optical coupler, the coupling efficiency with respect to another optical element such as optical fiber is especially excellent.

A second embodiment of the present invention will described below with reference to FIGS. 6 through 14.

Figure 6:
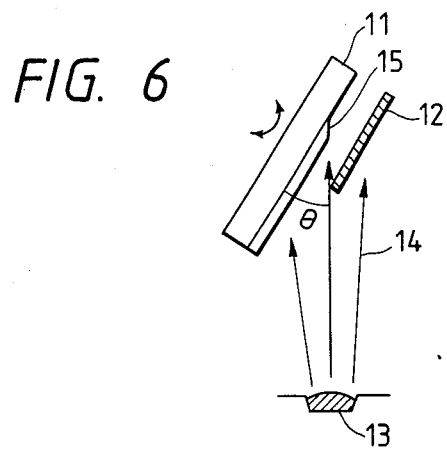
FIG. 6 is a view showing a process of fabricating a tapered waveguide of an optical waveguide element according to a second embodiment of the present invention.
Figure 7A:
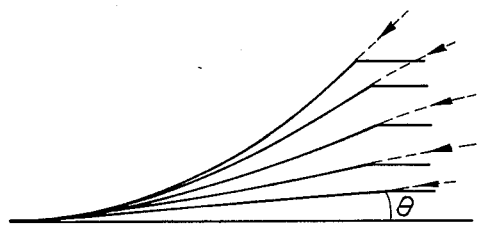
FIGS. 7(a) and 7(b) are views showing tapered shapes for the tapered waveguide of FIG. 6.
Figure 7C:
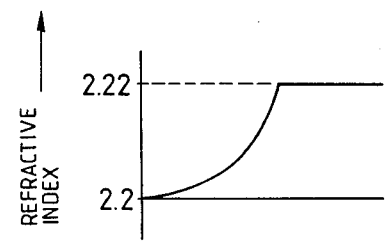
FIG. 7(c) is a diagram showing a distribution of refractive indexes of the tapered waveguide of FIG. 6.
Figure 7B:
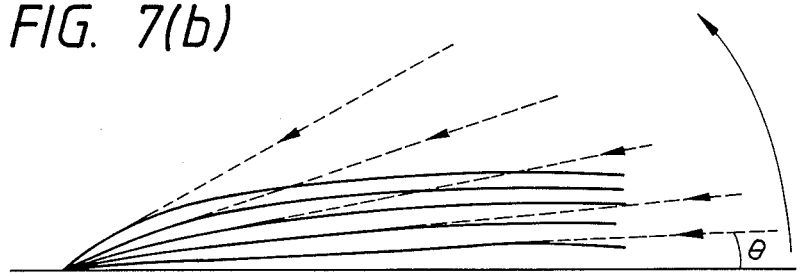

FIG. 6 shows a central portion of an evaporation device for manufacturing an optical waveguide element or an optical coupler in accordance with the present invention. A mask 12 of stainless steel, aluminum, or the like is positioned in spaced-apart relation to a dielectric substrate 11 of glass, $LiNbO_3$, $SiO_2$, $LiTaO_3$, or the like, and the mask 12 and the substrate 11 are inclined with respect to the direction in which particles 14 of a film material such as Ti, $LiNbO_3$, ZnO, ZnS, or the like are ejected from a sputtering target or evaporation source 13. Some of the film material particles 14 are blocked by the mask 12, whereas the remaining particles 14 are applied obliquely to the substrate 11, thus forming a film thickness distribution 15 which varies linearly in thickness. The angle $\theta$ at which the particles 14 are applied to the substrate 11 is varied by rotating the substrate 11 during the film growth. Since tapered thin films of different taper angles are successively deposited on the substrate 11 as shown in FIG. 7 by such substrate rotation, the final taper shape varies at a certain curvature as shown in FIG. 7(a) or 7(b) dependent on the center of rotation. For example, when Ti is deposited up to a thickness of 400 Å on a substrate of Z-cut $LiNbO_3$, and then diffused for 6 hours at 1000° C. in an atmosphere of mixed Ar and $O_2$, a refractive index distribution obtained is substantially proportional to the thickness of the Ti film as shown in FIG. 7(c) if the film has a thickness distribution as illustrated in FIG. 7(a). The surface refractive index of $LiNbO_3$ which has a refractive index of 2.20 with respect to extraordinary light is increased up to about 2.22 by diffusing Ti. The tapered portion 15 has a refractive index distribution which is in proportion to the concentration of diffusing Ti, i.e., the thickness of the Ti film.

Figure 8A:
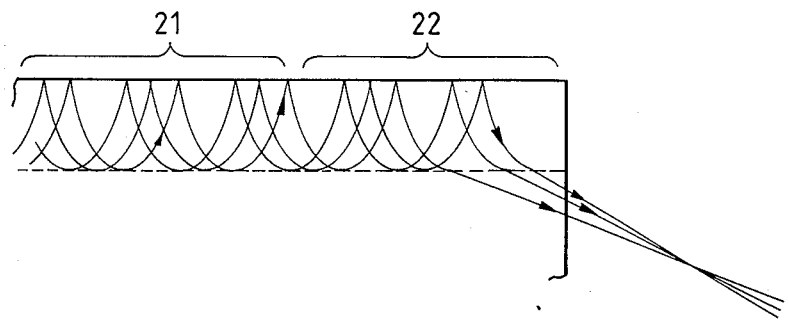
FIGS. 8(a) and 8(b) are views explaining light converging characteristics of the optical waveguide element of the second embodiment.
Figure 8B:
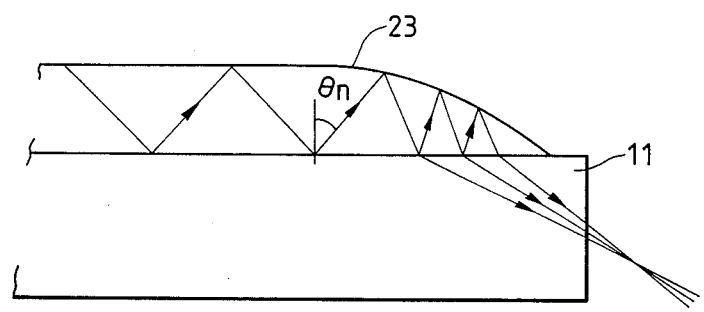

FIGS. 8(a) and (b) show how the optical waveguide element or optical coupler operates. As shown in FIG. 7(c), since the refractive index varies with a Gaussian distribution in the direction of depth in a waveguide 21, the angle formed between a guided light wave and a propagation axis smoothly varies dependent on the refractive index distribution. The light wave is propagated along an arcuate path as shown in FIG. 8(a). In a coupler region 22, the light wave cannot travel back as the effective refractive index is reduced, and radiates into the substrate. Where the effective refractive index varies in the direction of propagation in proportion to the square root of the distance the light ray is propagated, the radiated light is converged at a certain point.

When a laser beam is transmitted rightwardly into a tapered waveguide 23 formed on the substrate 11 and having a curvature at the tapered surface, and is applied to the tapered surface, the angle n of reflection is reduced by the tapered surface until it is smaller than the critical angle, light wave is refracted and radiates into the substrate. The tapered surface which is curved causes the refractive index of the tapered waveguide 23 to vary correspondingly, resulting in covering the light at a point.

During film growth, the substrate is rotated by a motor or the like. At this time, the speed of rotation may be varied once from a minimum taper angle to a maximum taper angle, or reciprocally varied a plurality of times between minimum and maximum taper angles. Where the angle of rotation is small, the substrate may be vibrated through that angle of rotation by a piezoelectric device or an electromagnetic actuator. The speed of rotation may not necessarily be constant. The tapered shape can be controlled by controlling the speed of rotation and the angle of rotation.

The process of depositing the film is not limited to vacuum evaporation, sputtering, ion beam sputtering, or the like. The distance between the substrate and the mask, and the distance between them and the evaporation source, the sputtering target, or the like are not limited to certain numerical values. Only the substrate may be rotated, or the substrate and the mask may be rotated together. The substrate material and the film material are not limited to the materials described above.

Figure 9:
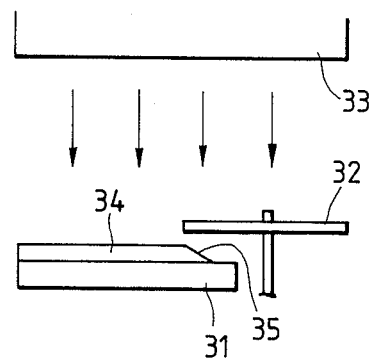
FIG. 9 is a side elevational view of a modified film thickness distribution producing device for producing the optical waveguide element of the second embodiment.

A modification of the present invention will be described below. FIG. 9 shows a central portion of a sputtering device according to the present invention. A mask 32 is rotatably disposed above a substrate 31 of $LiNbO_3$. Particles of a film material such as Ti ejected from a target 33 are deposited on the substrate 31, forming a thin film 34. Some of the particles are blocked by the mask 32, thus forming a region 35 in which the film thickness gradually varies. The mask 32 may be shaped as shown in FIG. 10, for example, with the distance between the center of rotation and the outer edge of the mask 32 being not constant. When the mask 12 rotates, therefore, the time in which a portion of the substrate 35 is covered with the mask 12 during film growth varies. The film thickness is smaller in an area which is covered with the mask 12 for a longer period of time, and is larger in an area which is covered with the mask 12 for a shorter period of time. This film forming process produces a film thickness distribution which can be controlled by the shape of the mask 12.

FIGS. 11(a) and 11(b) show the relationship between mask shapes and film thickness distributions. Only a quarter of each mask is illustrated in FIG. 11(a). Where the distance r from the center of rotation of a mask 41 to an outer mask edge is proportional to the angle of rotation, i.e., when r=k (k: proportionality constant) in FIG. 11(a), the produced film thickness distribution is of a linear pattern 44 as shown in FIG. 11(b). When r<k with a mask 42 in FIG. 11(a), the film thickness distribution is of a convex pattern 45 in FIG. 11(b) since the entire area covered with the mask is reduced. Conversely, when r>k with a mask 43 in FIG. 11(a), the film thickness distribution is of a concave pattern 46 as shown in FIG. 11(b).

The Ti film having a film thickness distribution in a varied-film-thickness region 48 as shown in FIG. 12(a) is patterned and thermally diffused by ordinary photolithography as shown in FIG. 12(b) to fabricate a distributed-refractive-index optical coupler having a distributed-refractive-index region 49 as shown in FIG. 12(c). Since the refractive index distribution is substantially proportional to the thickness of the Ti film, refractive index distributions corresponding to the various film thickness distributions as illustrated in FIG. 11(b) can be achieved.

Figure 13A:
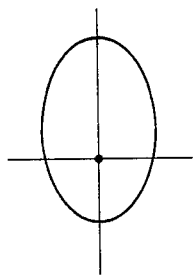
FIGS. 13(a), 13(b), and 13(c) are plan views of modified mask configurations.
Figure 13B:
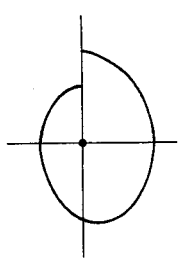
Figure 13C:
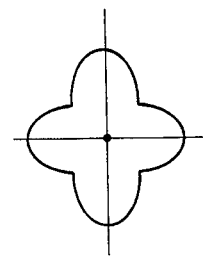
Figure 14A:
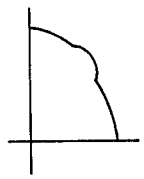
FIGS. 14(a) and 14(b) are a plan view of a modified mask shape and a cross-sectional view showing a film thickness distribution.
Figure 14B:
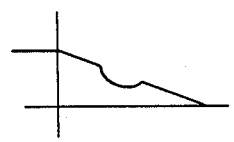

While the mask shape repeats itself at each ¼ period in FIG. 10, the present invention is not limited to such mask shape. A mask shape may repeat itself at each ½ period as shown in FIG. 13(a), at each period as shown in FIG. 13(b), at each ⅛ period as shown in FIG. 13(c), or at each smaller period. By employing a mask having a projection on its outer edge as shown in FIG. 14(a), the produced film thickness distribution may have a concave portion as shown in FIG. 14(b). Accordingly, various film thickness distributions or configurations can be produced by employing different mask shapes. Since a film thickness distribution is only determined by the shape of a mask used, and does not depend on the speed at which the film is deposited and other film growing conditions, the film thickness distribution can repeatedly be obtained with good reproducibility.

According to the aforesaid method of manufacturing an optical waveguide element or an optical coupler, the cost of manufacture is low since a film thickness distribution provided by a curved tapered surface configuration can be produced simply by applying a waveguide material to the surface of a dielectric substrate while rotating the latter or by rotating a mask while forming a waveguide film on the substrate. The refractive index distribution or the curvature of the tapered surface can be varied as desired by controlling the speed of rotation of the substrate, the speed at which the waveguide material is applied to the substrate, or the shape of the mask used. Accordingly, optical waveguide elements or optical couplers having film thickness distributions or refractive index distributions which meet various different uses or applications can easily be fabricated. The substrate or mask can easily be placed in a vacuum device since they only make rotary motion.

FIGS. 15 through 19 illustrate a third embodiment of the present invention.

Figure 15:
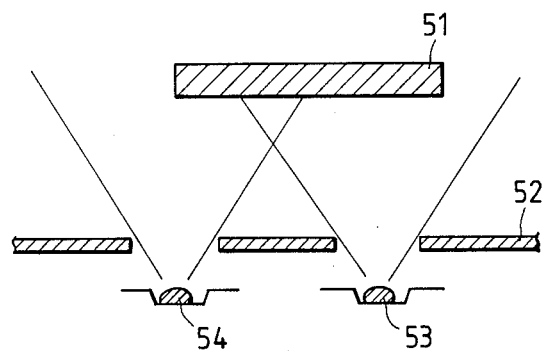
FIG. 15 is a cross-sectional view showing a simultaneous evaporation of Ti and MgO according to a third embodiment of the present invention.

FIG. 15 shows a central portion of an evaporation device for manufacturing an optical waveguide element or an optical coupler according to the present invention. A mask 52 having two holes for ejecting evaporated particles of Ti and evaporated particles of MgO, respectively, is placed below and parallel to a dielectric substrate 51 of Z-cut $LiNbO_3$, for example. An evaporant 53 of Ti and another evaporant 54 of MgO are evaporated and their particles are ejected through the two holes in the mask 52 to deposit a Ti layer and an MgO layer simultaneously on the substrate 51 overlappingly at their boundary. An evacuating system, a vacuum chamber, and a heat source such as a heater or an electron beam are omitted from illustration in FIG. 15.

Figure 16:
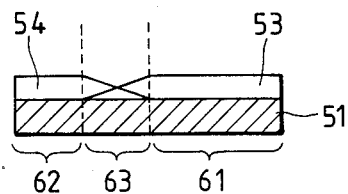
FIG. 16 is a view illustrating film thickness distributions of Ti and MgO.
Figure 17:
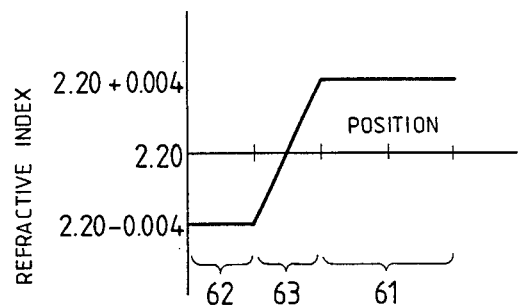
FIG. 17 is a graph showing a refractive index distribution of an optical waveguide after diffusion.

FIG. 16 shows film thickness distributions of the Ti layer 53 and the MgO layer 54 on the substrate 51 of $LiNbO_3$. The Ti and MgO layers 53, 54 are uniformly distributed in regions 61, 62 directly above the evaporation sources. The thickness of each of the layers 53, 54 is progressively reduced in a region 63 spaced from the positions directly above the evaporation sources. Therefore, the amount of Ti in the area 63 on the substrate 51 is progressively smaller to the left, and the amount of MgO in the region 63 is progressively larger to the left. The film thicknesses of Ti, MgO are 400Å, and 800Å, respectively, for example. FIG. 17 illustrates a refractive index distribution obtained after the layers 53, 54 have been diffused for 6 hours at 1000° C. The refractive index of the optical waveguide region 61 with respect to extraordinary light is increased about 0.004 by the diffusion of Ti. The optical waveguide region 63 with MgO diffused has its refractive index with respect to extraordinary light reduced about 0.004. The refractive index of the region 63 where the Ti and MgO layers overlap each other is progressively smaller in a direction away from the optical waveguide 61. The refractive index in each of the regions is also varied in the direction of the thickness substantially as a Gaussian distribution.

Figure 18:
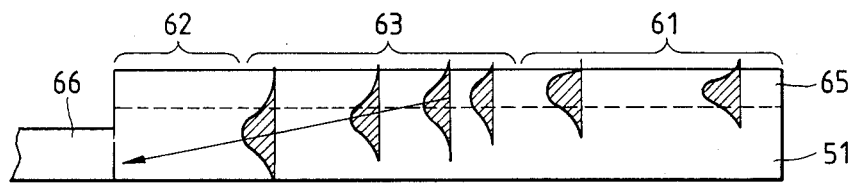
FIG. 18 is a view showing the principle of operation of a distributed-refractive-index optical coupler.
Figure 19:
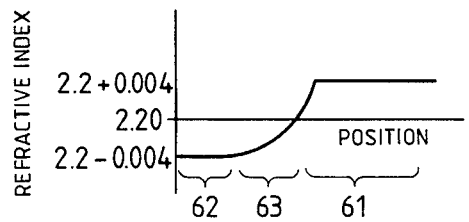
FIG. 19 is a graph showing a refractive index distribution according to a modification of the third embodiment.

The manner in which a light wave is propagated through the optical waveguide element thus fabricated is shown in FIG. 18. In the optical waveguide region 61, the refractive index of a Ti-diffused layer 65 is larger than that of the substrate 51, and the light wave is confined in and guided to the left through the Ti-diffused region 63. In the region 63 where both Ti and MgO are simultaneously diffused, the refractive index of the waveguide layer 65 is progressively reduced to the left. As the refractive index of the waveguide layer 65 becomes smaller, the distribution of the guided wave spreads into the substrate 51. As the refractive index of the waveguide layer 65 becomes much smaller, the guided wave is no longer confined in the waveguide layer 65 and is allowed to radiate into the substrate 51. The light which has radiated into the substrate 51 is coupled to an optical fiber 66, for example, placed on the left-hand end of the substrate 51. Thus, the region 63 serves as a distributed-refractive-index optical coupler.

In the above embodiment, the present invention is not limited to the illustrated sizes, distance between, and shapes of the holes in the mask. The positional relationship between the evaporation sources, the mask, and the substrate is not limited to the illustrated positional relationship. The process of depositing the films of Ti, MgO is not limited to vacuum evaporation, sputtering, ion beam sputtering, or the like. The film thicknesses of Ti, MgO and the time required to diffuse Ti, MgO are not limited to the numerical values described above. The material of the substrate is not limited to LiNbO$_3$. The film thickness distributions in the region where Ti and MgO are simultaneously deposited by evaporation are not limited to those illustrated. The refractive index distribution in the distributed-refractive-index optical coupler can be controlled by the film thickness distributions in such region. While the refractive index distributions are linearly varied in this embodiment, the refractive index may be varied in an upwardly concave fashion as shown FIG. 19 in proportion to about the square root of the distance of propagation, so that the light emitted into the substrate can be converged. The refractive index distribution is however not limited to the configuration of FIG. 19. The materials to be diffused are not limited to Ti and MgO.

While the slab-shaped waveguide has been described above, the principles of the invention are also applicable to a three-dimensional waveguide. For fabricating a three-dimensional waveguide, after Ti and MgO have been deposited by evaporation, the Ti and MgO layers are etched to a desired optical waveguide shape, and then diffused.

According to the above embodiment, after Ti and MgO have been deposited simultaneously by evaporation, they are diffused to produce an optical waveguide element or an optical coupler which has a desired refractive index distribution in the direction in which a light wave is propagated. By employing Ti which increases the refractive index of the substrate after diffusion and MgO which reduces the refractive index of the substrate after diffusion, a large change in the refractive index is obtained and a high-efficiency optical coupler is produced.

Figure 20:
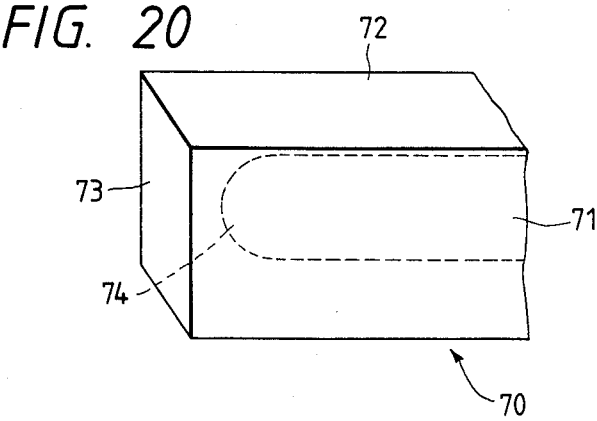
FIG. 20 is a fragmentary perspective view of an end portion of an optical waveguide element according to a fourth embodiment of the present invention.

FIGS. 20 through 27 illustrate a fourth embodiment of the present invention. FIG. 20 fragmentarily shows an end portion of an optical waveguide element according to the present invention. The optical waveguide element, denoted at 70, is made of a first linear optical material 71 having a high optical refractive index [one or more selected from the group consisting of titanium oxide (TiO$_2$), zinc oxide (ZnO), and nickel oxide (NiO), for example], and a second optical material 72 disposed around the first optical material 71 and having a lower refractive index than that of the first optical material 71 (the second optical material is one of lithium niobate (LiNbO$_3$) and lithium tantalate (LiTaO$_3$), for example). The second optical material 72 has a flat end 73, and the first optical material 71 has an end 74 close to the flat end 73 of the second optical material 72, the end 74 being embedded in the second optical material 72 and having a convexly curved surface.

The optical waveguide element shown in FIG. 20 is fabricated as follows: Titanium (Ti) is patterned on the surface of lithium niobate (LiNbO$_3$) by photolithography and thermally diffused, after which magnesium oxide (MgO) is patterned on the lithium niobate and then thermally diffused. The process of fabrication will be described in greater detail with reference to FIGS. 21(a) through 22(j), 22(a) and 22(b).

Figure 21A:
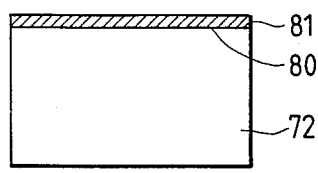
FIG. 21(a) through 21(f) are views showing a photolithography process for manufacturing the optical waveguide element of the fourth embodiment.
Figure 21F:
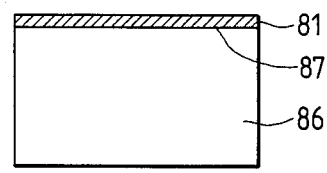
Figure 21B:
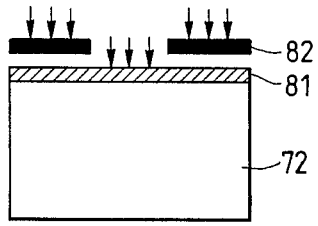
Figure 21G:
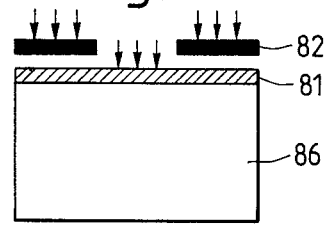
Figure 21C:
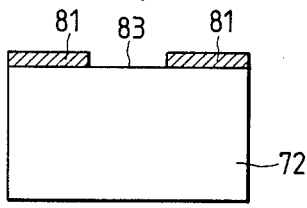
Figure 21H:
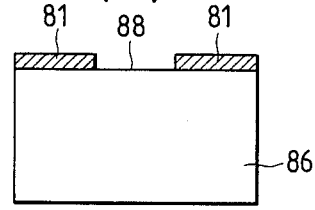
Figure 21D:
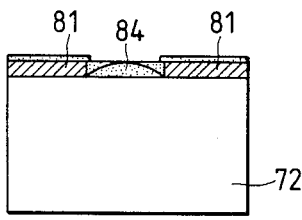
Figure 21I:
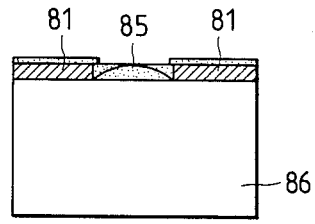
Figure 21E:
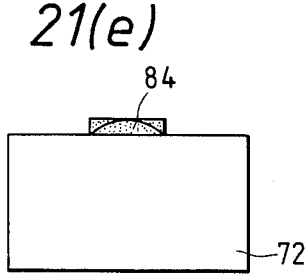
Figure 21J:
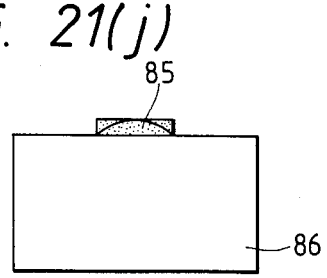
Figure 26A:
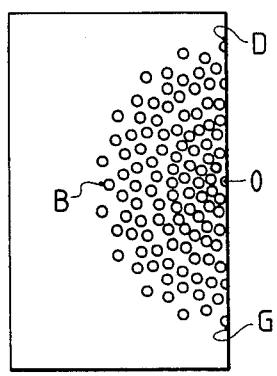
FIGS. 26(a) and 26(b) are views of slit plates for applying the refractive index modifiers.
Figure 26B:
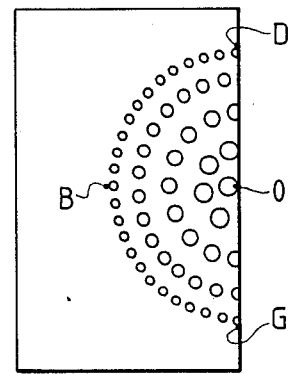
Figure 27A:
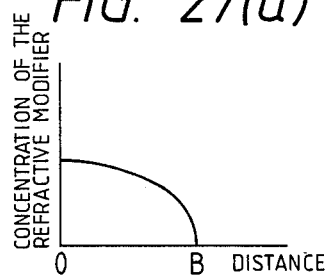
FIGS. 27(a) through 27(e) are graphs illustrating amounts applied of the refractive index modifiers.
Figure 27B:
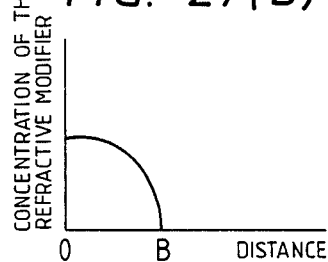
Figure 27C:
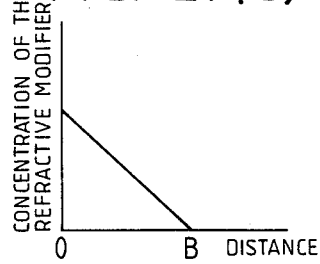
Figure 27D:
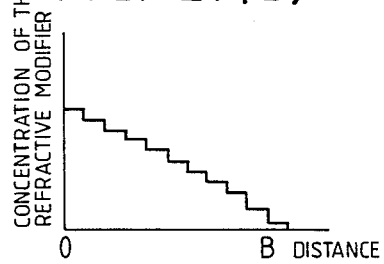
Figure 27E:
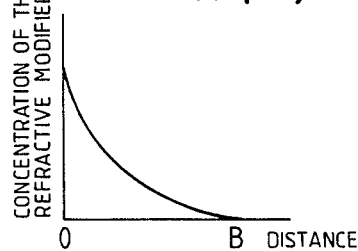

FIGS. 21(a) through 21(j) show a photolithography process for processing an optical material. First, a photosensitive photoresist 81 is deposited as a thin film on a surface 80 of the optical material 72 of lithium niobate (LiNbO$_3$) [FIG. 21(a)]. Then, the surface of the photoresist 81 is masked with a mask 82, except an area EDBGF shown in FIG. 22(a) where a first refractive index modifier of titanium (Ti) will be deposited on the optical material 72. By exposing the photoresist 81 to light through the mask 82 [FIG. 21(b)], the area of the photoresist 81 which has been exposed to the light is made dissolvable by a developing solution. Then, the photoresist 81 is treated with the developing solution to produce a structure shown in FIG. 21(c) which has the remaining photoresist 81 and an area 83 from which the photoresist 81 has been removed to expose the optical material 72. The area 83 corresponds to the area EDBGF shown in FIG. 22(a). Then, the first refractive index modifier 84 of titanium (Ti) is sputtered in the area 83 as shown in FIG. 21(d). The first refractive index modifier 84 may be deposited by vacuum evaporation. FIG. 22(b) fragmentarily shows in perspective the optical material 72 on which the refractive index modifier has been sputtered. The distribution of the concentration of the sputtered titanium is as shown in FIG. 23. As illustrated in FIG. 22(b), the layer of titanium in a rectangular area EDGF has a thickness of 700Å in this embodiment, and the layer of titanium in a semicircular area DBGO has a thickness of 700Å at a point O in the center of the semicircular area, with the thickness being parabolically reduced in inverse proportion to the radial distance from the point O. The amount (or thickness) of the thin titanium film in the semicircular area DBGO may have a radial distribution as shown in FIGS. 27(a) through 27(e). To obtain such a film amount or thickness distribution, a slit plate as shown in FIG. 26(a) is employed to deposit the refractive index modifier. The slit plate has a plurality of slits or holes of equal diameters which are adjusted in density from the center O to an arc DBG to obtain the desired amount distribution of the refractive index modifier. A slit plate shown in FIG. 26(b) may also be employed. The slit plate of FIG. 26(b) has slits or holes which are adjusted in size and number from the center O to the arm DBG to obtain the desired amount distribution of the refractive index modifier. Thereafter, the photoresist 81 is dissolved away by acetone, and the structure is ultrasonically cleaned, thus producing a blank with the titanium sputtered on the surface 80 of the lithium niobate [FIG. 21(e)].

Then, the sputtered titanium is thermally diffused into the lithium niobate for eight hours at 1000° C.

Thereafter, magnesium oxide is patterned by photolithography and thermally diffused on the surface 80 of the optical material 71 with the titanium diffused, in the same manner that the titanium has been patterned by photolithography and thermally diffused on the surface 80 of the optical material 72. More specifically, as shown in FIG. 21(f), a photoresist 81 is deposited as a thin film on a surface 87 of an optical material 86 with the titanium patterned thereon. Then, a mask 82 is placed on the photoresist 81 to expose the latter in the same area as that in which the first refractive index modifier has been deposited [FIG. 21(g)]. After the photoresist 81 has been exposed to light through the mask 82, it is treated with a developing solution to produce a structure shown in FIG. 21(h) which has the remaining photoresist 81 and an area 88 from which the photoresist 81 has been removed to expose the optical material 86. The area 88 corresponds to the area EDBGF shown in FIG. 22(a). Then, a second refractive index modifier 85 of magnesium oxide (MgO) is sputtered in the area 88 as shown in FIG. 21(i). The sputtering process causes magnesium (Mg) and magnesium oxide (MgO) to be scattered on the photoresist 81. The second refractive index modifier 85 may be deposited by vacuum evaporation. The magnesium thus deposited by sputtering the magnesium oxide as shown in FIG. 22(b) has a concentration distribution as shown in FIG. 23. The magnesium layer in the rectangular area EDGF has a thickness of 250Å in this embodiment, and the magnesium layer in the semicircular area DBGO has a thickness of 250Å at the point O in the center of the semicircular area, with the thickness being parabolically reduced in inverse proportion to the radial distance from the point O. The amount (or thickness) of the thin magnesium film in the semicircular area DBGO has the same radial distribution as that of the titanium film as described above, and the amount distribution of the magnesium is obtained in the same manner, as the titanium film is deposited as described above. Thereafter, the photoresist 86 is dissolved away by acetone, and the structure is ultrasonically cleaned, thus producing a blank with the magnesium sputtered on the surface 87 of the lithium niobate [FIG. 21(j)].

Figure 25:
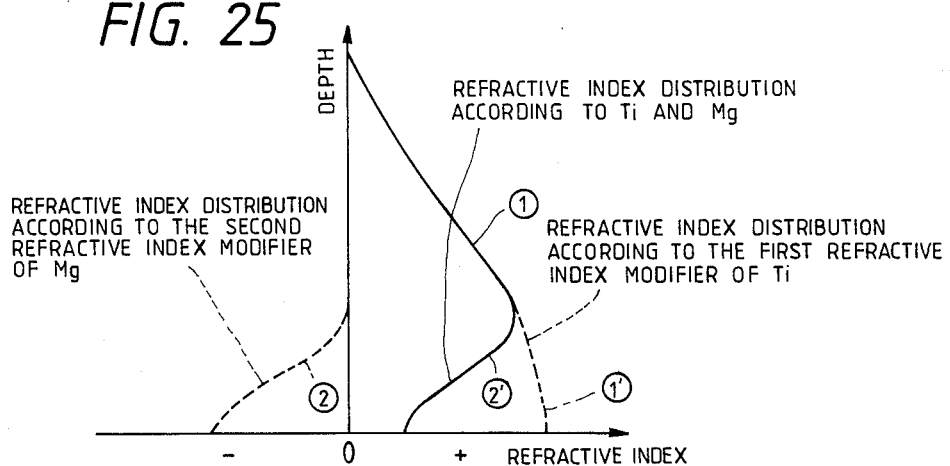

Then, the blank with the sputtered magnesium is subjected to thermal diffusion for 3 hours at 950° C. to diffuse the diffused titanium, the sputtered magnesium and magnesium oxide into the optical material. As a result, the titanium is diffused into a depth ranging from 7 to 8μm from the surface of the optical material, and the magnesium is diffused into a depth of 1μm from the surface of the optical material. The optical refractive index distribution in the optical material thus produced is indicated by refractive index contour lines $n_1$ through $n_6$, in FIG. 24 ($n_1 < n_2 < n_3 < n_4 < n_5 < n_6$), at a cross section taken along line A—O—C—A' in FIG. 22(a). A curve $S_2$ represents a refractive index distribution in the direction of the depth. As shown in FIG. 25, the first refractive index modifier of titanium provides a refractive index distribution indicated by a curve ①-①', and the second refractive index modifier of magnesium provides a refractive index distribution indicated by a curve ②. Since both of the first and second refractive index modifiers are diffused, the curves ①-①' and ② are combined to provide a combined refractive index distribution indicated by a curve ①-②' which is provided by the first and second refractive index modifiers of titanium and magnesium. As a consequence, an optical waveguide having a higher refractive index is formed at a certain depth from the surface of the substrate made of optical material, and the end of the optical waveguide has a spherical refractive index distribution.

As described above, by diffusing first and second refractive index modifiers in an optical material, an optical waveguide having a higher refractive index is formed in the optical material, and the distal end of the optical waveguide has a convexly curved surface. Since the distal end of the optical waveguide is disposed within the optical material, it would not be broken away or rounded. When light wave entering the optical waveguide is propagated through the optical material and reaches the convexly curved distal end of the optical waveguide, the light is converged by the convexly curved end of the optical waveguide, without being scattered, and guided into the optical waveguide.

Figure 22A:
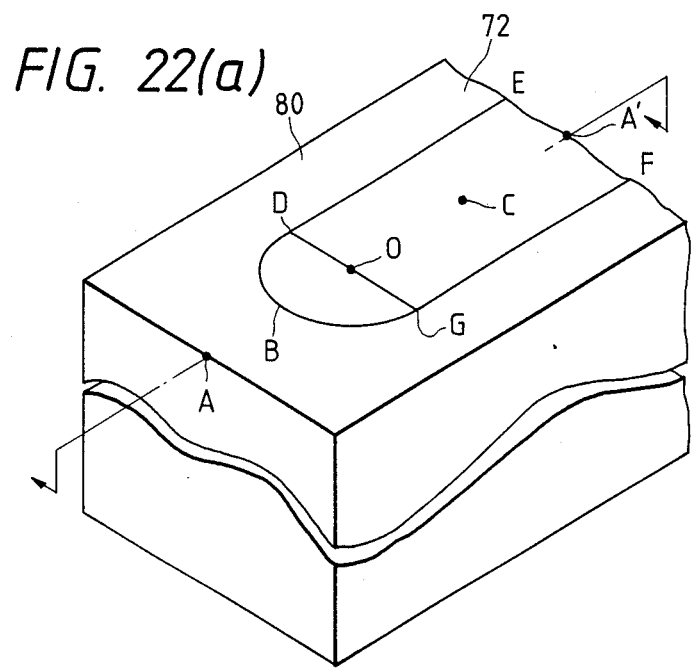
FIG. 22(a) is a fragmentary perspective view of an end portion of an optical material for the optical waveguide element of the fourth embodiment.
Figure 22B:
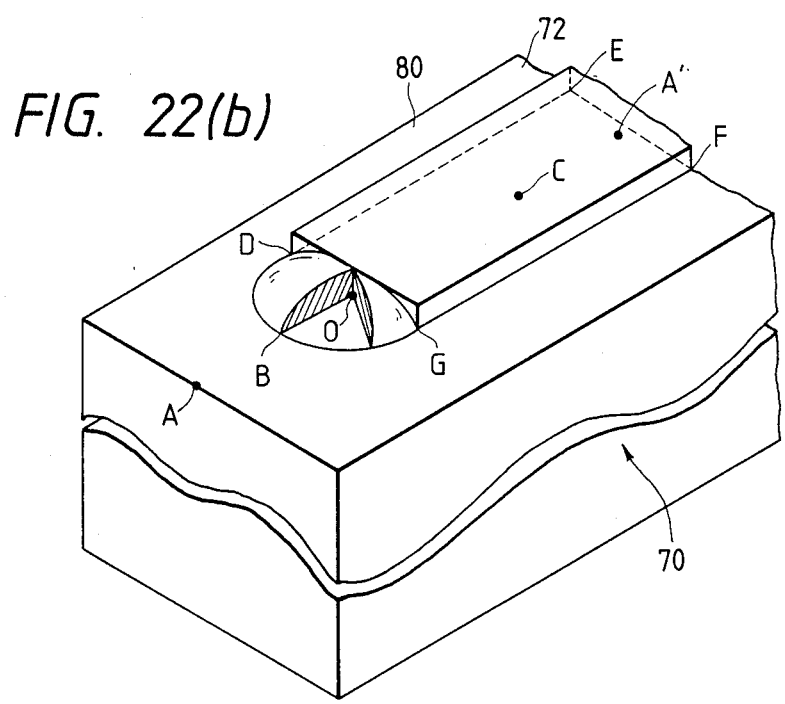
FIG. 22(b) is a fragmentary perspective view of the end portion shown in FIG. 22(a) on which refractive index modifiers are sputtered.
Figure 23:
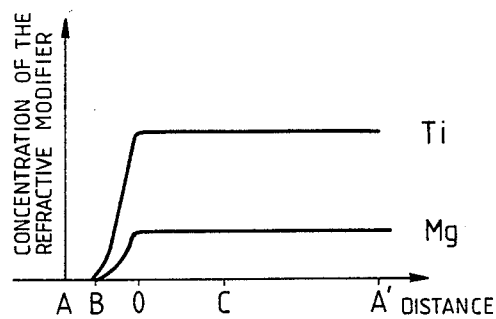
FIG. 23 is a graph showing the concentrations of the refractive index modifiers applied to the optical material.
Figure 24:
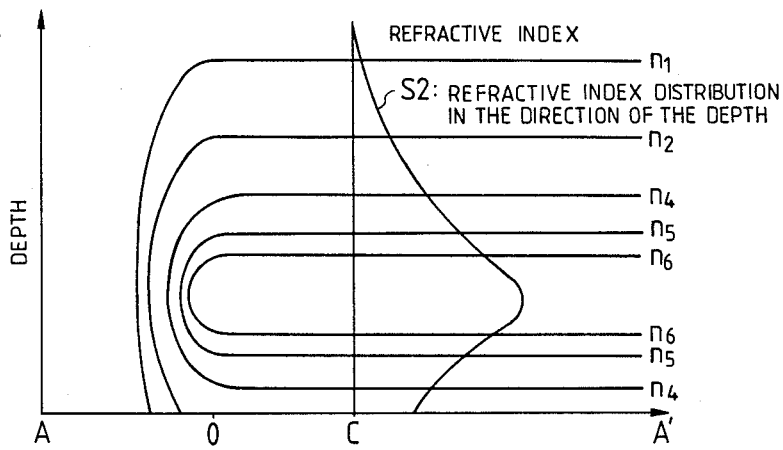
FIGS. 24 and 25 are graphs showing refractive index distributions from the surface of the substrate of the optical waveguide element according to the fourth embodiment.

The sputtered amounts of the first and second refractive index modifiers in the semicircular area DBGO shown in FIG. 22(a) may have quadratic and exponential distributions radially from the center O of the arc DB. The titanium and magnesium may therefore have distributions such that the end of the optical waveguide in the optical material has a convex refractive index distribution providing a lens effect.

The optical waveguide element of the above embodiment, as described above, includes a first linear optical material and a second optical material disposed around the first optical material and having a lower refractive index than that of the first optical material, the end of the first optical material embedded in the second optical material having a convexly curved surface. The end of the optical waveguide which is constructed of the first optical material is prevented from being broken away or rounded. Therefore, when light is introduced into the optical waveguide, the light is not scattered or refracted by the end of the optical waveguide as it is not broken away or rounded.

According to the process of manufacturing the above optical waveguide element, a first refractive index modifier deposited in a prescribed area is diffused in an optical material, and a second refractive index modifier is deposited in the same area as the first refractive index modifier and then thermally diffused. The optical material contains a region where the first and second refractive index modifiers are mixed, and a region where the first refractive index modifier is present. In the region where the first and second refractive index modifiers are mixed, the refractive index of the first refractive index modifier is lowered by the second refractive index modifier. The first and second refractive index modifiers are deposited in the prescribed shape and have prescribed thickness distributions. An optical waveguide having a higher refractive index with its distal end convexly curved is formed in the optical material. When light is introduced into the optical waveguide element having such an optical waveguide, the light is propagated through the optical material and then converged and guided into the optical waveguide when the light reaches the end of the optical waveguide.

A fifth embodiment of the present invention will be described with reference to FIGS. 28 through 30.

Figure 28A:
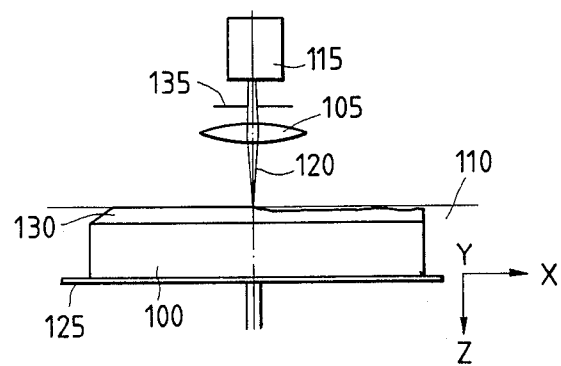
FIGS. 28(a) through 28(e) are views of a process of manufacturing an optical waveguide element in accordance with a fifth embodiment of the present invention.
Figure 28B:
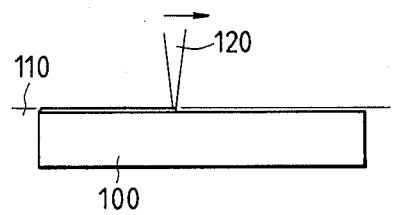
Figure 28C:
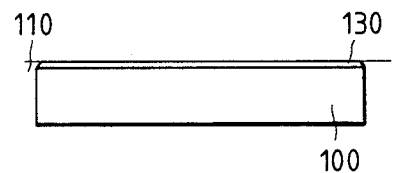
Figure 28D:
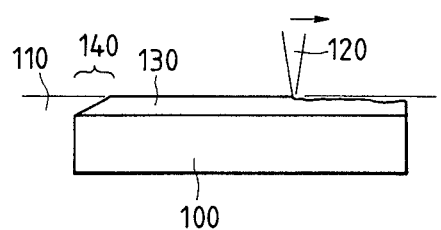
Figure 28E:
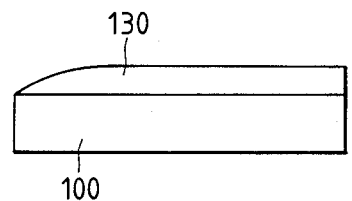

As shown in FIG. 28(a), a substrate 100 of glass having a refractive index of 1.457 is placed on a table 125 which is vertically movable (in the direction of a Z-axis), and put in an ultraviolet-curing resin 110 which can be cured to have a refractive index of 1.46 by exposure to ultraviolet radiation having a power output of 150 mW/cm$^2$ and a wavelength ranging from 300 to 400 nm for 20 seconds, the substrate 100 having its upper surface slightly below the surface of a liquid of the ultraviolet-curing resin 110. A laser beam having a wavelength of 325 nm emitted from a He-Cd laser 115 is converged onto the surface of the substrate 100 by a lens 105. At this time, the laser beam is passed through a rectangular aperture 135 so that it is of a rectangular shape with its dimension in the Y-direction being equal to the width of a waveguide. A process of producing the optical waveguide element having an effective refractive index which varies nonlinearly is shown in FIGS. 28(b) through 28(e). In FIGS. 28(b) and 28(c), the substrate 100 is disposed slightly below the surface of a liquid of the resin 110, and scanned with the converged He-Cd laser beam 120 in the X-direction to produce a cured layer 130 having a small width in the Y-direction. Then, the table 125 is lowered, and the resin 110 starts to be cured by the laser beam 115 from a position spaced from the end of the substrate 100 to leave a tapered portion 140, as shown in FIG. 28(d). The above step is repeated, and then the uncured resin 110 is removed by an organic solvent, thus forming a waveguide and an effective distributed-refractive-index region as shown in FIG. 28(e).

FIG. 29 shows a film thickness distribution, by way of example, of the ultraviolet-curing resin, and FIG. 30 shows a distribution of effective refractive indexes given by the film thickness distribution of FIG. 29. As the effective refractive index is lowered, a guided wave is radiated from the waveguide into the substrate. Since the beam intensity distribution of the emitted light wave can be varied by varying the effective refractive index distribution, it is possible to couple the emitted light with an optical fiber or the like highly efficiently. It is apparent that light wave can be introduced back into the waveguide in the same fashion as described above. While the effective refractive index is varied by varying the thickness of the optical waveguide layer in this embodiment, the waveguide may remain uniform in thickness, and an optical material having a thickness distribution may be deposited on the waveguide in the same manner as described above. When producing the effective refractive index, the substrate 100 is submerged in the resin 110 in the illustrated embodiment. However, the resin 110 may be coated on the substrate 100 by a process such as spin coating.

With this embodiment, therefore, an optical coupler having an effective refractive index distribution can be fabricated by a simple process.

A sixth embodiment of the present invention will be described with reference to FIGS. 31 through 34.

FIG. 31 shows a double-face optical coupler according to the present invention. The double-face optical coupler, denoted at 150 comprises a substrate 151 made of a light-transmissive optical material, a first optical waveguide layer 152 disposed on one side of the substrate 151, and a second optical waveguide layer 153 disposed on the other side of the substrate 151. The first and second optical waveguide layers 152, 153 are tapered toward an end 151a of the substrate 151, and the tapered regions are referred to as first and second tapered couplers 152a, 153a, respectively. When a light wave guided through the first waveguide layer 152 is propagated into the first tapered coupler 152a, it is gradually radiated into the substrate 151, and then emitted out of the substrate end 151a. The light wave which has entered the second tapered coupler 153a from the substrate end 151a is converted into a guided mode in which the light wave is propagated through the second wave-guide layer 153. Each of the tapered couplers 152a, 153a will be described below.

Figure 33:
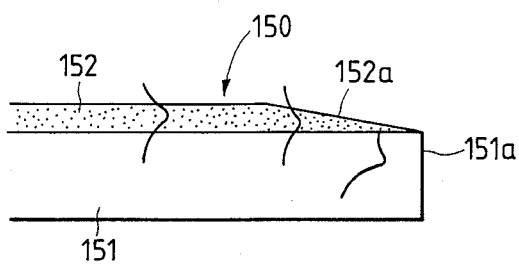
FIG. 33 is a fragmentary cross-sectional view explaining the principles of operation of the tapered coupler shown in FIG. 32.

FIG. 32 shows in perspective the tapered coupler. The optical waveguide layer 152 is fabricated on the substrate 151 which is made of a crystal of Z-cut lithium niobate (LiNbO$_3$), for example. The optical waveguide layer 152 is of a three-dimensional structure, and has a surface refractive index of 2.204 with respect to the substrate 151 which has a refractive index of 2.2. The optical waveguide layer 152 has a width of 4 μm and a Gaussian refractive index distribution in the direction of its depth (in the Z-axis direction). The substrate 151 is tapered toward the end 151a thereof. The principles of operation of the tapered coupler will be described with reference to FIG. 33. A light wave which has been propagated through the optical waveguide 152 has a beam configuration having an intensity distribution as shown in FIG. 33. When the light wave is propagated through the tapered coupler 152a, its intensity distribution is gradually varied, and the energy of the light wave which corresponds to the variation in the intensity distribution is radiated into the substrate 151 having a smaller refractive index difference. The tapered coupler 152a has a cutoff region or position where it can no longer confine the guided light wave. As the light wave further processes, all light energy thereof is radiated into the substrate 151 in the cutoff region at an efficiency of 70%. This holds true when light enters the tapered coupler 152a from the substrate 151. A process of fabricating the tapered coupler 152a will be described below.

Titanium (Ti) is patterned on a crystal of Z-cut LiNbO$_3$ at a width of 4 μm up to a thickness of 300Å toward the substrate end 151a. Then, the patterned titanium is diffused for 5 hours at 1000° C. to produce the optical waveguide layer 152. The optical waveguide layer 152 is ground to tapered shape for a length of 200 μm in the Y-direction up to the substrate end 151a, thus forming the tapered coupler 152a.

Figure 34:
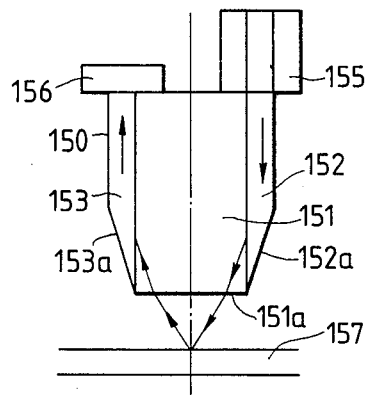

The double-face optical coupler may be incorporated in a device for reading an optical disc, for example, as shown in FIG. 34. In FIG. 34, a semiconductor laser 155 as a light source and a photodetector 156 for effective photoelectric conversion are directly coupled to the double-face optical coupler 150. An optical disc 157 is disposed such that a line normal thereto is aligned with a line normal to the substrate end 151a. A laser beam emitted from the semi-conductor laser 155 is guided into and propagated through the first optical waveguide layer 152. Then, the laser beam is emitted from the substrate end 151a toward the optical disc 157. Light reflected by the optical disc 157 then enters the substrate end 151a and is propagated back through the second optical waveguide layer 153. The amount of light is detected by the photodetector 156. If the optical disc 157 contains recorded information as reflectivity variations, then the photodetector 156 detects a modulated signal indicative of the recorded information.

While light is emitted from and enters the tapered shapes of the optical waveguide layers, the present invention is not limited to the tapered configuration. More specifically, the guidance of a light wave through a waveguide layer is described by an effective refractive index, and the above arrangement means that the effective refractive index is varied in the direction in which the wave progresses. For example, a variation in the effective refractive index can be achieved by providing a refractive index distribution which is provided by gradually varying the amount of titanium diffused in the direction in which the guided wave progresses, as with the first embodiment shown in FIGS. 1 through 5.

With the above embodiment, as described above, a highly efficient optical coupler can be accomplished simply by giving an effective refractive index distribution to the distal end of an optical waveguide layer, and both sides of a substrate can effectively be utilized. Where the optical coupler is incorporated in a device for reading an optical disc or the like, the device can be manufactured more easily and inexpensively than heretofore, and a line normal to the substrate end and a line normal to the optical disc can easily be aligned with each other.

Figure 35:
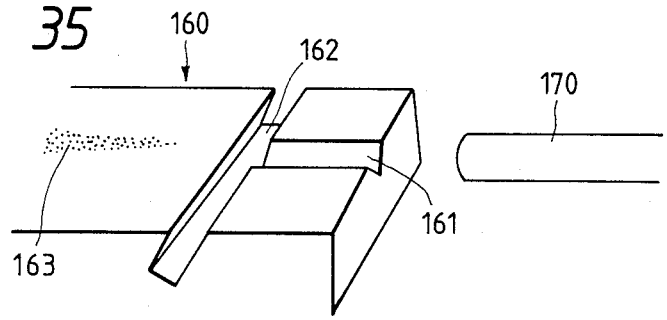
FIG. 35 is a fragmentary perspective view of a distributed-refractive-index optical coupler according to a seventh embodiment of the present invention and an optical fiber associated with the optical coupler.
Figure 36:
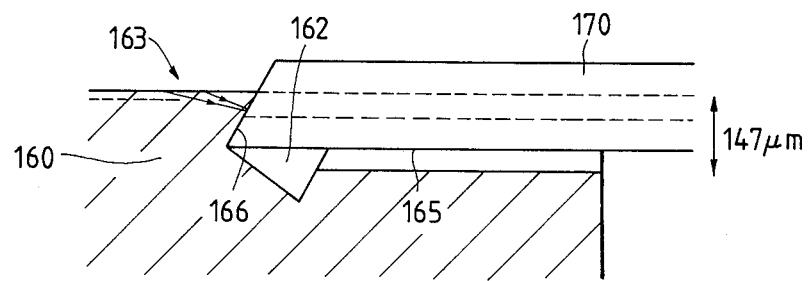
FIG. 36 is a fragmentary cross-sectional view explaining the principles of operation of the optical coupler.
Figure 37:
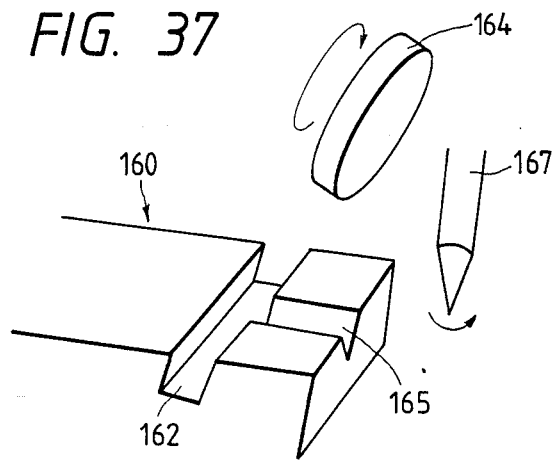
FIG. 37 is a fragmentary perspective view showing the manner in which the optical coupler of the seventh embodiment is fabricated.

FIGS. 35 through 37 show a seventh embodiment of the present invention. FIG. 35 shows an optical coupler of the seventh embodiment in perspective, and FIG. 36 shows the optical coupler in cross section.

An optical coupler 160 comprises an optical waveguide fabricated on a crystal of LiNbO$_3$ by diffusing Ti or the like, and has a distributed-refractive-index region 163 at an optical coupling end thereof. A groove 162 is defined in the region 163 in a direction perpendicular to the direction in which a guided light wave is propagated through the region 163, and is inclined at a certain angle to the surface of the region 163, the groove 162 being of a mirror finish. The optical coupler 160 also has a groove 165 defined in the direction of propagation of the guided light wave for positioning an optical fiber 170 on the optical coupler 160.

The grooves 162, 165 are formed by a process shown in FIG. 37. The groove 162 for emitting and introducing light is cut in the region 163 by a grinding blade 164 made of SiC which is directed perpendicularly to the direction of travel of light wave and at an angle to the surface of the region 163, while applying a grinding solution mixed with SiO$_2$. The groove 163 thus cut has a practical mirror surface for emitting and introducing light. The positioning groove 165 is cut by an ultra-steel drill 167. The cutting process is more disadvantageous than the grinding process in that it produces chips, but since the grooves 162, 165 are spaced apart from each other, the cutting process does not affect the positional accuracy of the optical fiber when it is placed in the groove 165. The distributed-refractive-index region 163 is produced by forming a thin Ti film on Y-cut LiNbO$_3$ such that the thickness of the region 163 is $400 \times [(-\times/6000)^{0.52} + 1]$Å for a length of 6000 $\mu$m in the direction of travel of a guided light wave (in the X-axis direction), and then by diffusing the Ti film for 6 hours at 1000° C. Light is emitted from the region 163 at an angle of about 0.0113 radian to the surface of the region 163. Since the refractive index of LiNbO$_3$ is 2.2 for the Y-cut crystal and TM mode propagation, the emitted light travels parallel to the surface of the region 163 by tilting the ground groove surface 166 at about 1.558 radian with respect to the surface of the region 163. The emitted light is converged in a position which is about 850 $\mu$m spaced from the end of the region 163 and about 22 $\mu$m deep. By grinding the tip end of the optical fiber 170 at an angle of 0.0128 radian with respect to the axis thereof, inclining the distal end surface of the positioning groove 165 at 60°, and making the distal end thereof 147 $\mu$m deep, the optical fiber 160 can be positioned in abutment against the ground groove surface 166, so that the optical coupler and the optical fiber 170 can optically coupled to each other without any subsequent positioning adjustments.

While the guided wave is converged at the ground surface 166 and the obliquely ground end of the optical fiber 170 is held against the ground surface 166 for optical coupling in the above illustrated embodiment, the tip end of the optical fiber 170 may be ground to provide a surface normal to the axis thereof, and light which is converged outside of the crystal of the optical coupler 160 may be coupled to the optical fiber 170.

The grooves 162, 165 may be cut by laser machining, ion milling, or the like rather than the illustrated mechanical machining process.

With the seventh embodiment described above, an optical coupler and an optical fiber can optically be coupled highly efficiently through a simple positioning structure.

An eighth embodiment of the present invention will hereinafter be described with reference to FIGS. 38 through 44.

Figure 38:
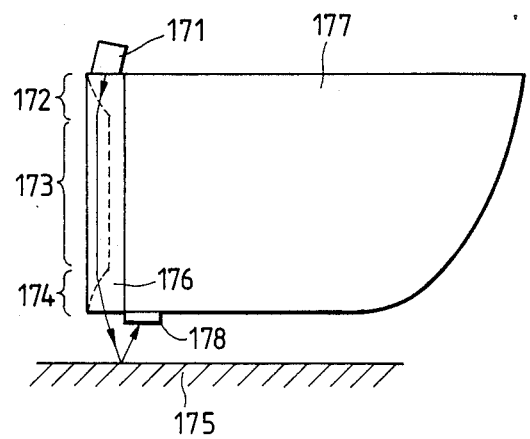
FIG. 38 is a side elevational view of an optical head according to an eighth embodiment of the present invention.

FIG. 38 shows an optical head according to the present invention. A laser beam emitted from a light source 171 such as a semiconductor laser or the like is coupled to an optical waveguide 173 by a distributed-refractive-index optical coupler 172, and emitted onto a recording medium 175 by a distributed-refractive-index optical coupler 174 having a light converging capability. Since the laser beam is emitted into an optical waveguide 176 by the optical coupler 174, the direction in which the laser beam is emitted is held at an angle to the direction in which the laser beam is propagated through the optical waveguide 173. The optical waveguide 173 and the optical couplers 172, 174 are fixed to a slider 177 which is floating closely above the recording medium 175 rotating at a high speed. The slider 177 floats through the action of air at a constant spacing above the recording medium 175 in the same manner as a floating head slider for use with a normal magnetic disc. The point at which the light emitted from the distributed-refractive-index optical coupler converges is always kept on the recording medium surface to effect light beam focusing at all times. Light reflected from the recording medium 175 is detected by a photodetector 178 which produces an information signal and a tracking signal.

Figure 39:
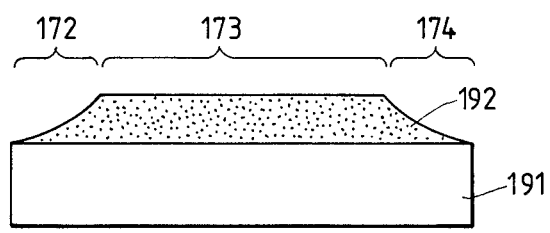
FIG. 39 is a view showing a film thickness distribution of Ti before diffusion for manufacturing a waveguide and a distributed-refractive-index optical coupler for use in the optical head of FIG. 38.
Figure 40:
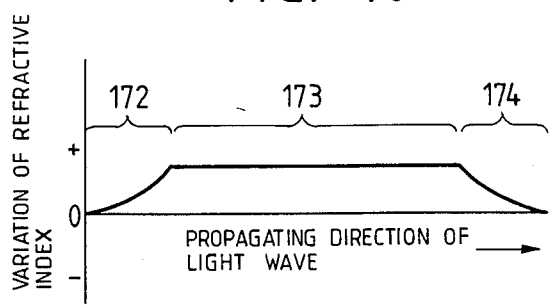
FIG. 40 is a graph showing a refractive index distribution of the waveguide and the distributed-refractive-index optical coupler.

The optical waveguide 173 and the optical couplers 172, 174 are fabricated by thermally diffusing a film 192 of Ti formed on a substrate 191 made of a crystal of LiNbO$_3$ as shown in FIG. 39. The film 192 has a uniform thickness distribution in the optical waveguide 173. Each of the optical couplers 172, 174 has a film thickness which is nonlinearly varied toward the end of the substrate 191. When the Ti film with such a film thickness distribution is diffused, the refractive index of the fabricated optical head has a distribution as shown in FIG. 40. More specifically, by diffusing Ti, the refractive index of LiNbO$_3$ is increased at a ratio dependent on the thickness of the Ti film. The refractive indexes of the optical couplers 172, 174 at the opposite ends of the optical waveguide are varied as shown in FIG. 40 in proportion to the square root of the distance that a guided light wave is propagated. When a light wave progresses to the right through the optical coupler 174, for example, since the effective refractive index with respect to the guided light wave becomes progressively smaller, the guided light wave is gradually spread into the substrate and then radiated into the substrate near the cutoff point. The radiated light is converged because the refractive index distribution is not linear. Conversely, light emitted from the converging point toward the optical coupler can effectively be coupled to the optical waveguide. The laser beam emitted from the semi-conductor laser 171 is therefore highly efficiently coupled to the optical waveguide 173 by the optical coupler 172. The light emitted from the optical coupler 174 is converged onto the surface of the recording medium 175 at all times with the slider 177 floating over the recording medium 175, so that high-density recording of information on the recording medium 175 is made possible.

Figure 41:
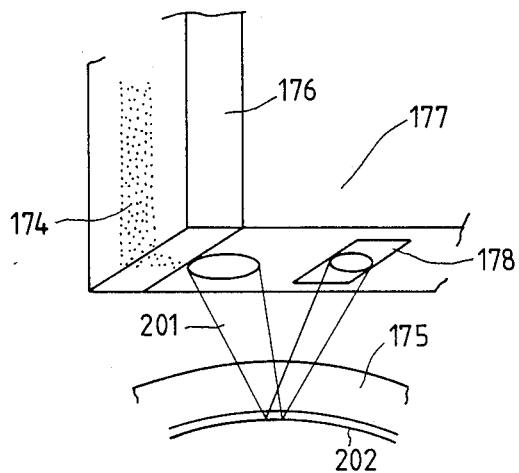
FIG. 41 is a fragmentary perspective view explanatory of a reproducing process according to the optical head.
Figure 42:
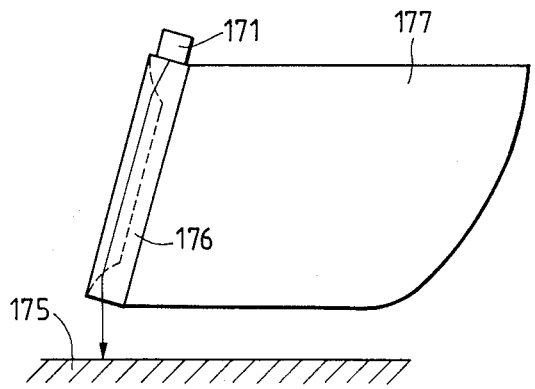
FIG. 42 is a side elevational view of a modified optical head.

As shown in FIG. 41, a laser beam 201 emitted from the optical coupler 174 is converged and applied to the recording medium 175 which has a tracking guide groove 202, and light reflected from the recording medium 175 is diffracted by the guide groove 202. Tracking can be effected by the push-pull process by detecting the reflected light with a pair of photodiodes 178 which produce respective output signals. A tracking error signal can be produced from the difference between the output signals from the photodiodes 178, and an information signal can be produced from the sum of the output signals from the photodiodes 178.

Figure 43:
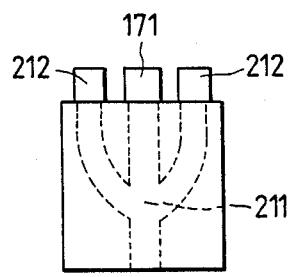
FIG. 43 is a view of waveguides of the modified optical head.

The substrate 176 may not necessarily be held perpendicularly to the recording medium 175, but may be arranged such that emitted light will be directed perpendicularly to the surface of the recording medium 175. As shown in FIG. 43, an optical waveguide 211 may have three branches, with the light source 171 such as a semiconductor laser connected to the central waveguide branch and photodetectors 212 connected to the waveguide branches on the opposite sides of the central branch. Due to diffraction caused by the guide groove on the recording medium, the intensity of light travelling through the central waveguide branch is smaller and the intensity of light going through the opposite branches is higher. Therefore, light of a greater energy level is transmitted through the opposite waveguide branches and detected by the photodetectors 212. A tracking error signal is produced from the difference between the output signals of the photodetectors 212, and an information signal is generated from the sum of the output signals of the photodetectors 212. An optical isolator may be inserted between the waveguide 211 and the light source 171 so that no reflected light will return to the light source 171.

Figure 44:
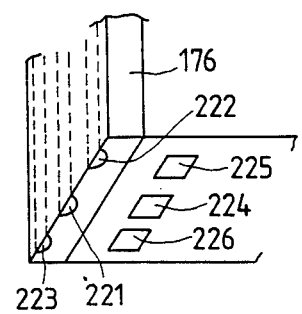
FIG. 44 is a fragmentary perspective view of an optical head according to another modification.
Figure 45:
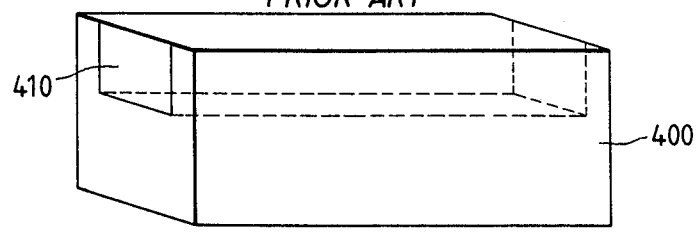
FIGS. 45 through 52 are views illustrating conventional optical waveguide elements and methods of manufacturing the same.
Figure 46:
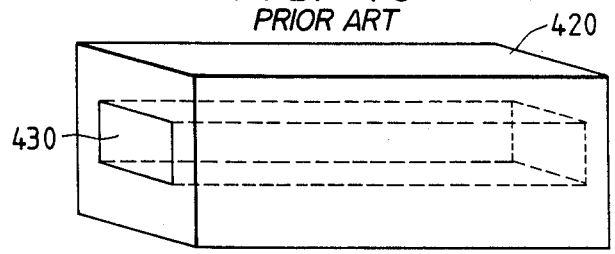
Figure 47:
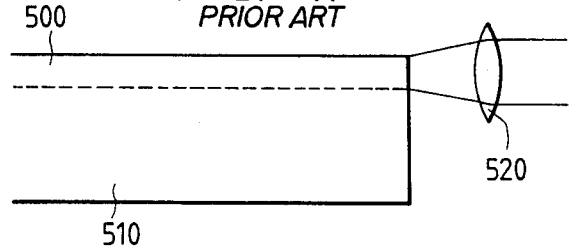
Figure 48:
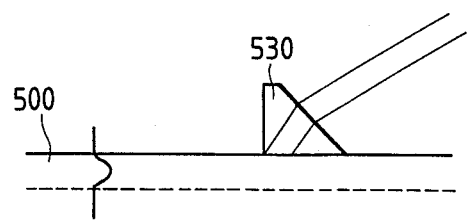
Figure 49:
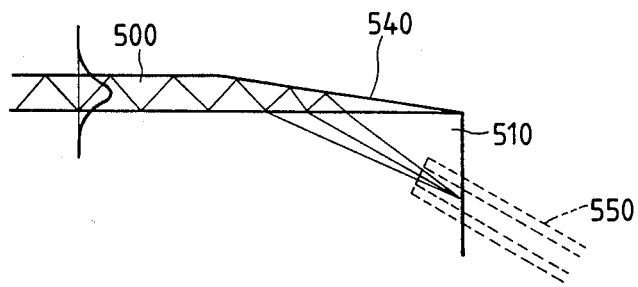
Figure 50:
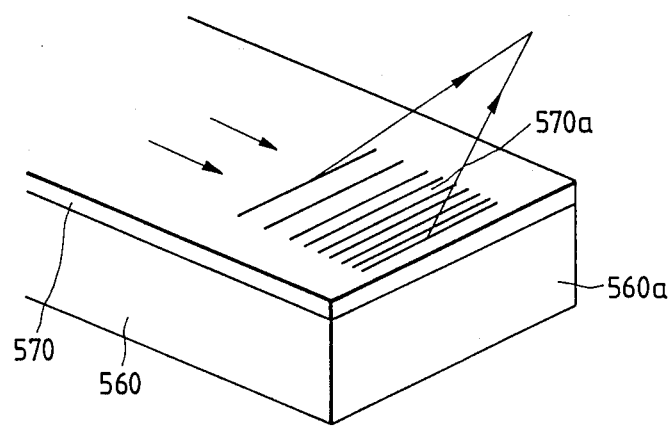
Figure 51:
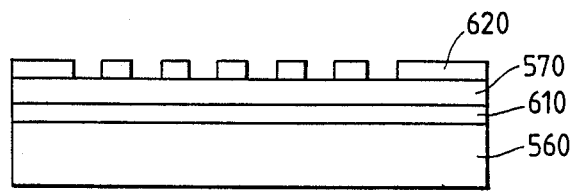
Figure 52:
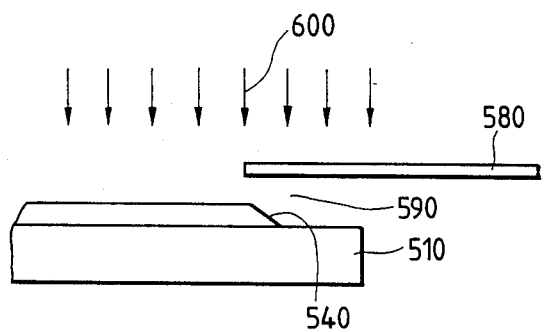

FIG. 44 shows another modification in which light outputs from three waveguides 221, 222, 223 are detected by respective photodetectors 224, 225, 226. The spots of light emitted from the waveguides 222, 223 on the opposite sides of the central waveguide 221 are applied, by half, to tracks on the recording medium which are disposed on the opposite sides of a track from which recorded information is being reproduced. This process is known as a three-beam tracking process.

The slider and the optical waveguide or waveguides may be formed of different materials. The slider may be formed of LiNbO$_3$, glass, or the like, and the waveguide or waveguides may directly be fabricated on the slider. The refractive index distribution of each of the optical couplers is not limited to any configuration. A light beam emitted from the light source may be introduced into the optical waveguide in any of various ways. For example, the light source may be coupled to the optical waveguide directly or through an optical fiber or the like.

With the optical head of the eighth embodiment, as described above, a light source, an optical waveguide with its light emitting region having a light converging capability, and a photodetector are all mounted on a slider which is floating closely on a recording medium. Therefore, the optical head of the invention can achieve a high access speed which is comparable with the speed at which a read head would access a fixed disc. The optical head is small in size and lightweight. Since the number of parts making up the optical head is small, any locations where optical axis adjustments are needed are few, and the number of steps required to assemble the optical head is small.

Although certain preferred embodiments have been shown and described, it should be understood that many changes and modifications may be made therein without departing from the scope of the appended claims.

What is claimed is:

1. An optical waveguide element comprising a light-transmissive dielectric substrate, and an optical waveguide formed on said substrate and having a higher refractive index than the refractive index of said substrate, said optical waveguide having an effective refractive index which varies nonlinearly in a direction in which a light wave is propagated through said optical waveguide.

2. An optical waveguide element according to claim 1, wherein said optical waveguide has an effective refractive index which is increased nonlinearly in the direction in which the light wave is propagated through said optical waveguide.

3. An optical waveguide element according to claim 1, wherein said optical waveguide had an effective refractive index which is reduced nonlinearly in the direction in which the light wave is propagated through said optical waveguide.

4. An optical waveguide comprising a first linear optical material and a second optical material disposed around said first optical material and having a lower refractive index than the refractive index of said first optical material, said second optical material having a flat end, said first optical material having an end on the same side as said flat end of the second optical material, said end of said first optical material being embedded in said second optical material and having a convexly curved surface.

5. An optical coupler comprising an optical waveguide element including a light-transmissive dielectric substrate, and an optical waveguide formed on said substrate and having a higher refractive index than the refractive index of said substrate, said optical waveguide having an effective refractive index which varies nonlinearly in a direction in which a light wave is propagated through said optical waveguide, for emitting light from and introducing light into said optical waveguide.

6. An optical coupler comprising an optical waveguide element including a light-transmissive dielectric substrate, and an optical waveguide formed on said substrate and having a higher refractive index than the refractive index of said substrate, said optical waveguide being formed on each of opposite ends of said substrate, said optical waveguide having an effective refractive index which varies nonlinearly in a direction in which a light wave is propagated through said optical waveguide.

7. An optical coupler comprising an optical waveguide element including a light-transmissive dielectric substrate, and an optical waveguide formed on said substrate and having a higher refractive index than the refractive index of said substrate, said optical waveguide having an effective refractive index which varies nonlinearly in a direction in which a light wave is propagated through said optical waveguide, for emitting light from and introducing light into said optical waveguide, said optical waveguide having an inclined surface through which the light is emitted from and introduced into the optical waveguide.

8. An optical coupler according to claim 7, wherein said surface is inclined to cause the light to travel parallel to said substrate.

9. An optical coupler according to claim 7, wherein said optical waveguide has a groove for positioning therein an optical fiber with respect to said optical waveguide.

* * * * *

UNITED STATES PATENT AND TRADEMARK OFFICE
CERTIFICATE OF CORRECTION

PATENT NO. : 4,865,407
DATED : September 12, 1989
INVENTOR(S) : Akihiro SUZUKI et al.

It is certified that error appears in the above-identified patent and that said Letters Patent is hereby corrected as shown below:

IN THE CLAIMS:

Claim 3, line 2, change "had" to --has--.

Signed and Sealed this

Fifth Day of June, 1990

Attest:

HARRY F. MANBECK, JR.

Attesting Officer

Commissioner of Patents and Trademarks